United States Patent Office 3,252,864
Patented May 24, 1966

3,252,864
STABLE FAT-SOLUBLE VITAMIN-CONTAINING
COMPOSITIONS
Heinrich Kläui, Riehen, Switzerland, assignor to Hoffmann-La Roche Inc., Nutley, N.J., a corporation of New Jersey
No Drawing. Filed Nov. 29, 1963, Ser. No. 327,055
Claims priority, application Switzerland, Dec. 7, 1962, 14,387/62
14 Claims. (Cl. 167—81)

This invention relates, in general, to novel vitamin compositions. More particularly, the invention relates to stable fat-soluble vitamin-containing compositions, to the production of such compositions and to the use thereof in the fortification of foods and feeds.

It is well known that certain fat-soluble vitamins, especially vitamin A, are extremely sensitive compounds. For example, vitamin A alcohol and the conventional esters of vitamin A alcohol such as vitamin A acetate, vitamin A palmitate, etc. are sensitive to the oxidizing influences of the atmosphere and, as a result, these compounds undergo decomposition when they are allowed to stand even for relatively short periods of time under normal atmospheric conditions. Recognizing this, the art has proposed numerous procedures and techniques for stabilizing vitamin A compounds. Thus, for example, it has been suggested that vitamin A compounds are stabilized by mixing same with suitable antioxidant materials. While, for the most part, antioxidants have proven to be helpful, the results obtained simply by the use of antioxidants left much to be desired.

Additionally, it has been suggested that the decomposition of vitamin A compounds could be obviated, or at least minimized, by incorporating such compounds into some suitable protective medium. One of the earliest prior art proposals involved the adsorption of vitamin A on a suitable inert carrier such as, oatmeal. It was found, however, that the vitamin component of such an adsorbate was stabilized, but only to a relatively slight degree. In a further attempt to protect vitamin A alcohol and its esters from decomposition, it was proposed to embody these sensitive compounds into an oil or fat in order to form a solution thereof. The stability of the vitamins in such solutions did not, however prove to be entirely satisfactory.

At the present time, a major portion of the commercially available vitamin A products are provided in the form of colloidal dispersions. In the production of these dispersions, it is the usual practice to prepare first an emulsion of vitamin A in an aqueous colloid, for example, in gelatin or gum arabic, and, subsequently, to work up this emulsion into discrete, finely divided particles each of which contains the vitamin in coated form. While such products are generally satisfactory insofar as the stability of the vitamin component is concerned, the products are relatively expensive to produce.

It has now been discovered that vitamin preparations, having outstanding stability, can be obtained simply by mixing a fat-soluble vitamin material with a mixture comprising an antioxidant and secondary amine, of the type hereinafter described, as a synergist.

In the practice of this invention there can be used, in general, any fat-soluble, vitamin-containing material. Thus, for example, the present compositions can contain vitamin A, vitamin D, vitamin E or vitamin K or mixtures thereof. Additionally, the compositions of this invention can contain, as the material to be stabilized, a carotenoid compound. Included among the carotenoid compounds which can be employed herein are β-carotene; β-apo-8'-carotenal; β-apo-8'-carotinic acid ester, such as the ethyl ester; canthaxanthin; zeaxanthin; lycopene, etc. For convenience of expression, all of the materials mentioned in this paragraph, that is, the vitamins themselves, as well as the related carotenoid compounds, will be referred to in this specification and the claims thereof by the generic expression "fat-soluble vitamin materials."

As the antioxidant component of the present compositions, one can use, for example, 6-ethoxy-2,2,4-trimethyl-1,2-dihydroquinoline; butylated hydroxy anisole; butylated hydroxy toluene; 4,4-bis-(2,6-ditertiary butyl phenol); γ-tocopherol; esters of gallic acid; or mixtures of any of the foregoing. In general, any ester of gallic acid with an alcohol, particularly an aliphatic monohydroxy alcohol, having at least about 3 carbon atoms can be used in the practice of this invention. Such esters include, for example, propyl gallate, octyl gallate, decyl gallate, dodecyl gallate, etc. In the preferred practice of the invention, however, 6-ethoxy-2,2,4-trimethyl-1,2-dihydroquinoline is used since this compound has been found to have outstanding antioxidizing properties. However, compositions having exceptional stability characteristics are obtained in the practice of the invention even when a less effective antioxidant is employed. Thus, for example, in carrying out this invention, it may be desired, for some reason or other, to employ a naturally occurring substance, such as γ-tocopherol, as the antioxidant. While γ-tocopherol is less effective as an antioxidant than 6-ethoxy-2,2,4-trimethyl-1,2-dihydroquinoline, it has been observed that a high degree of stabilization is achieved when γ-tocopherol is used in admixture with the synergist material hereinafter described.

The synergists which are used in the practice of this invention are characterized broadly as secondary aliphatic amines which are liquid or solid at room temperature and secondary cycloaliphatic amines which are liquid or solid at room temperature. Included among the secondary amines which are suitable for use are those having the formula:

$$R—CH_2—NH—CH_2—R'$$

in which the symbol R repersents an alkyl, hydroxyalkyl or aminoalkyl group; and in which the symbol R' represents an alkyl, hydroxyalkyl, or aminoalkyl group.

Such amines, it will be noted, have an unsubstituted methylene group in the α-position to the nitrogen atom. Among the secondary aliphatic amines and secondary cycloaliphatic amines which are suitable for use in the practice of this invention, dialkylamines are especially useful. More particularly, dialkylamines having a total of 12 to 20 carbon atoms in their chain, for example, decyl pentyl amine; dodecyl pentyl amine; tetrahydrogeranyl hexyl amine; tetrahydrogeranyl octyl amine; diheptyl amine; tetradecyl butyl amine, etc. are preferably used. Additionally, dialkanolamines, preferably lower dialkanolamines, such as, diethanolamine; salts of such dialkanolamines with higher fatty acids; di(aminoalkyl) amines such as spermine, spermidine, etc.; proline; and mixtures of such amino compounds are extremely well suited for use as the synergist. Moreover, one can use higher fatty acid salts of spermine and spermidine, such as, spermine palmitate, spermidine palmitate, etc. as the synergist in the practice of this invention.

The quantity of antioxidant which is used in carrying out this invention can be varied within rather wide ranges. In general, the compositions of this invention will contain the antioxidant in a quantity which is at least about 0.1% of the weight of the material to be stabilized. Ordinarily, however, the amount of antioxidant which is used will not exceed about 50% of the weight of the material to be stabilized.

The quantity of synergist which is used in the practice of this invention is also variable within rather wide ranges. As a general rule, however, the products of this invention will contain the synergist in a quantity which is at least about 0.1% of the weight of the material to be stabilized. However, substantially greater quantities of synergist can be employed if desired. For example, it has been found to be convenient to use a quantity of synergist which is at least equal to the quantity of antioxidant employed. It is even more convenient to employ from about 2 to about 10 parts by weight of the synergist for each part by weight of the antioxidant used.

It has been observed that the practice of this invention will be facilitated greatly by the use, as the synergist, of an amine which is soluble in oils and fats. For this reason, it is convenient to employ the lower dialkanol amine synergists in the form of their readily dispersible salts with higher fatty acids such as palmitic acid, stearic acid, oleic acid, etc. The foregoing notwithstanding, however, it should be understood fully that even the lower dialkanolamines which, in and of themselves, are insoluble in fats and oils exert an extraordinary strong synergistic effect when used in the combination disclosed herein.

The stabilized vitamin compositions of this invention are readily prepared. In general, the procedure involves merely the mixing of the material to be stabilized with the antioxidant and the synergist, preferably in an inert atmosphere. Variations in the basic procedure will be obvious to persons skilled in the art and some of these variations will be demonstrated in the examples which follow hereinafter.

The stabilized vitamin compositions which are produced as described herein are eminently well suited for use as supplements for foods and feedstuffs. The compositions, which in and of themselves are stable, can be used as is or they can be incorporated into the food or feedstuff in admixture with some diluent. In certain instances, for example, where it is desired to obtain a product of some specific potency or concentration or where it is desired to have the product in powder form, the addition of the present products to a diluent may be preferred. As the diluent there can be used, for example, a vegetable meal such as, oatmeal, soyameal, etc.; fats, paraffins, waxes or wax-like compounds, such as hydrogenated castor oil, hydrogenated cottonseed oil; solid triglycerides or partial glycerides, for example, glyceryl monostearate, amides of higher fatty acids, for example, stearic acid amide; oils, such as, peanut oil, cottonseed oil, sesame oil, etc.; protein-containing materials, such as skimmed milk powder, casein, calcium caseinate, glutin, zein, gelatin, etc.; carbohydrates, such as, lactose, starches, dextrin, gum arabic, methyl cellulose; metal soaps, such as, magnesium stearate, magnesium palmitate, calcium stearate, aluminum stearate, etc.; physiologically compatible mineral carrier materials, such as, magnesium oxide, magnesium hydroxide, tricalcium phosphate; and mixtures of any of the various diluents. However, particularly well suited for use as diluents are vegetable oils, hydrogenated castor oil, glutin, calcium caseinate, gelatin, skimmed milk powder, magnesium stearate, magnesium oxide and mixtures thereof. It will be appreciated that the diluents can be incorporated into the presently disclosed products during the production thereof. In the alternative the stabilized vitamin composition, after its production, can be mixed with the desired diluent.

The vitamin compositions of this invention are characterized particularly by their enhanced stability. They are very well suited for use in the fortification of various foods and feedstuffs with fat-soluble vitamins. When used as supplements for foods and feedstuffs, the vitamin component or components of the present products are stable even when such foods and feedstuffs are stored under unfavorable conditions.

For a fuller understanding of the nature and objects of this invention, reference may be had to the following examples which are given merely as further illustration of the invention and are not to be construed in a limiting sense.

*Example 1*

92 grams of vitamin A palmitate were homogeneously mixed with 2 grams of γ-tocopherol and 6 grams of tetradecyl butyl amine by stirring at room temperature in an atmosphere of nitrogen. There was obtained a clear solution which, on storage, possessed enhanced vitamin A stability.

*Example 2*

32 grams of arachis oil were heated, with the exclusion of air, to a temperature of 90° C. and 5 grams of palmitic acid were dissolved therein. Thereafter, 2 grams of diethanolamine were uniformly distributed throughout this solution while stirring. Subsequently, 60 grams of vitamin A palmitate and 1 gram of γ-tocopherol were added to, and distributed uniformly in, the solution by stirring. The resulting solution, a concentrate containing 1 million I.U. of vitamin A per gram, was found to be suitable for use directly in the vitamin supplementation of, for example, food fats and food oils.

*Example 3*

74 grams of cottonseed oil stearate were melted by heating to a temperature of 70° C. and, while stirring and excluding air, the molten mass was mixed with 3 grams of 6-ethoxy-2,2,4-trimethyl-1,2-dihydro-quinoline and 3 grams of diethanolamine. Thereafter, 20 grams of vitamin A palmitate were added to, and homogenously stirred into the mixture, following which the mixture was poured onto cold metal plate. The solidified fat-mass was then ground with the addition of Dry Ice. The resulting powder was found to be suitable for use in the vitamin A enrichment of feed-meals.

*Example 4*

56 grams of cottonseed oil stearate were melted by heating to a temperature of 70° C. and, while stirring and excluding air, mixed with 3 grams of 6-ethoxy-2,2,4-trimethyl-1,2-dihydro-quinoline and 3 grams of diethanolamine. Thereafter, 18 grams of oatmeal and 20 grams of vitamin A palmitate were added to, and homogenously stirred into the molten mass, following which the melt was poured onto cold metal plates. The solidified fat-mass was then ground with the addition of Dry Ice. The powdery product, which was thus obtained, was found to be suitable for the vitamin A enrichment of feed-meals.

*Example 5*

66 grams of hydrogenated castor oil were melted by heating at a temperature of 95° C. and, while stirring and excluding air, the molten mass was mixed with 3 grams of 6-ethoxy-2,2,4-trimethyl-1,2-dihydro-quinoline and 3 grams of diethanolamine. Thereafter, 8 grams of glutin and 20 grams of vitamin A palmitate were added to the mixture and homogenously stirred therein. The mass was then dropped at 95° C. onto a plate of 11 cm. diameter which was rotating at 3000 revolutions per minute, causing the mass to be sprayed to fine droplets. The spray-plate was situated 3 meters above the collecting surface. The fat droplets were all solidified when they landed upon the collecting layer. The product which was obtained in this manner, after separation into different screen fractions, if necessary, can be used for the vitamin enrichment of feeds. A majority of the discrete particles produced by this method were between 0.15 and 0.45 mm. in size.

*Example 6*

65 grams of hydrogenated castor oil were melted by heating to a temperature of 95° C. and, while stirring and excluding air, mixed with 3 grams of 6-ethoxy-2,2,4-trimethyl-1,2-dihydro-quinoline and 4 grams of dodecyl pentylamine. Thereafter, 8 grams of magnesium oxide and 20 grams of vitamin A palmitate were added to, and homogenously stirred in the mixture, following which the molten mass was poured onto cold metal plates. The solidified fat-mass, which was thus obtained was ground with the addition of Dry Ice. The resulting powdery product was found to be suitable for the vitamin A enrichment of feed-meals.

*Example 7*

3 grams of vitamin A palmitate, 0.45 g. of 6-ethoxy-2,2,4-trimethyl-1,2,-dihydro-quinoline and 0.6 g. of diethanolamine were uniformly stirred in an atmosphere of nitrogen until a uniform mixture was obtained. Thereafter, the mixture was adsorbed onto 96 grams of oatmeal in a mixing drum. This absorbate was found to be useful for the vitamin fortification of feed mixtures, particularly feed-meals.

*Example 8*

93.5 grams of hydrogenated castor oil were heated in a vacuum at a temperature of 130° C. 5 grams of β-apo-8′-carotinal, 0.5 gram of propyl gallate and 1 gram of tetrahydrogeranyl hexyl amine were then dissolved in the molten fat. The melt was sprayed through a heated spray-gun. During a fall through a distance of about 4 meters, the droplets solidified into discrete particles. These particles were found to be highly suited for directed addition to feedstuff mixtures.

*Example 9*

89 grams of hydrogenated castor oil were heated to a temperature of 135° C., in vacuum. 5 grams of β-apo-8′-carotinic acid ethyl ester, 3 grams of γ-tocopherol and 3 grams of diheptylamine were then added to, and dissolved in, the molten fat. The molten mass was thereafter added to a cooled metal drum. The product was scraped off in the form of fine flakes after solidification. The product, in flake form, was found to be suitable for use in the fortification of feeds. Moreover, a powdery product, obtained by grinding the flaked product in the presence of Dry Ice, was found to be suitable for use as a vitamin supplement for feeds.

*Example 10*

67 grams of hydrogenated castor oil were heated to a temperature of 95° C. and, at that temperature, mixed with 25 grams of dl-α-tocopherol, 0.5 gram of butylated hydroxy anisole, 0.5 gram of butylated hydroxy toluene, 2 grams of tetradecyl butylamine, and 5 grams of calcium caseinate. The mixture was sprayed onto a spray-plate, in the manner described in Example 5. The resulting powder was found to be suitable for the enrichment of feeds with vitamin E.

*Example 11*

In order to compare the stability of a vitamin A product containing an antioxidant and a synergist with that of products which did not contain the combination, the following preparations were formulated:

(a) 200 mg. of vitamin A palmitate are treated with 4 mg. of γ-tocopherol.
(b) 200 mg. of vitamin A palmitate are homogenously mixed with 4 mg. of γ-tocopherol and 8 mg. of diethanolamine.
(c) 200 mg. of vitamin A palmitate are mixed with 8 mg. of diethanolamine.
(d) 200 mg. of pure vitamin A palmitate (without stabilizer).

Each of the products (a), (b), (c) and (d) were stored in the air at 45° C. on a glass plate of 9 cm.² area. At time intervals of 12 hours, the vitamin A content of sample was determined. The space of time in which the vitamin A content had decreased to 80% was considered as the induction period.

Product (b), the product of this invention stabilized with the synergist mixture, showed an induction period longer, by many times, than that of product (a) which is stabilized only with the antioxidant. There was practically no difference between products (c) and (d), both of which proved to be unstable.

*Example 12*

In this example, the following two preparations were formulated:

(a) 200 mg. of vitamin A palmitate were mixed with 4 mg. of γ-tocopherol and 28 mg. of diethanolamine palmitate (corresponding to 8 mg. of diethanolamine).
(b) 200 mg. of vitamin A palmitate were mixed with 4 mg. of γ-tocopherol and 8 mg. of spermine base.

The products (a) and (b) were stored under the same conditions described in Example 11. A study revealed that product (a) had an induction period which was about three times longer than that of product (b) of Example 11. Product (b) of this example, containing spermine, was more stable than product (a) of this example containing diethanolamine palmitate.

I claim:

1. A composition comprising (1) a fat-soluble vitamin material (2) an antioxidant selected from the group consisting of 6-ethoxy-2,2,4-trimethyl-1,2-dihydroquinoline, butylated hydroxy toluene, butylated hydroxy anisole, 4,4′-bis(2,6-ditertiary butyl phenol), γ-tocopherol and an ester of gallic acid with an aliphatic monohydroxy alcohol having from about 3 to 12 carbon atoms and (3), as a synergist, a member selected from the group consisting of an amine having the formula

R—CH₂—NH—CH₂—R₁ in which R is a member selected from the group consisting of alkyl, hydroxyalkyl and aminoalkyl and in which R₁ is a member selected from the group consisting of alkyl, hydroxyalkyl and aminoalkyl and salts of such amines with higher fatty acids, there being present in said composition a quantity of component (2) which is from about 0.1% to about 50% of the weight of said component (1) and a quantity of component (3) which is at least about 0.1% of the weight of said component (1) and which is not more than about 10 times the weight of said component (2).

2. The composition of claim 1 containing additionally a diluent.

3. A composition comprising (1) a vitamin A substance (2) an antioxidant selected from the group consisting of 6-ethoxy-2,2,4-trimethyl-1,2-dihydroquinoline, butylated hydroxy toluene, butylated hydroxy anisole, 4,4′-bis(2,6-ditertiary butyl phenol), γ-tocopherol and an ester of gallic acid with an aliphatic monohydroxy alcohol having from about 3 to 12 carbon atoms and (3), as a synergist, a member selected from the group consisting of an amine having the formula

R—CH₂—NH—CH₂—R₁ in which R is a member selected from the group consisting of alkyl, hydroxyalkyl and aminoalkyl and in which R₁ is a member selected from the group consisting of alkyl, hydroxyalkyl and aminoalkyl and salts of such amines with higher fatty acids, there being present in said composition a quantity of component (2) which is from about 0.1% to about 50% of the weight of said component (1) and a quantity of component (3) which is at least about 0.1% of the weight of said component (1) and which is not more than about 10 times the weight of said component (2).

4. A composition comprising (1) β-apo-β-carotinal (2) an antioxidant selected from the group consisting of 6-ethoxy-2,2,4-trimethyl-1,2 - dihydroquinoline, butylated hydroxy toluene, butylated hydroxy anisole, 4,4′-bis(2,6-ditertiary butyl phenol, γ-tocopherol and an ester of gallic acid with an aliphatic monohydroxy alcohol having from about 3 to 12 carbon atoms and (3), as a synergist, a member selected from the group consisting of an amine having the formula

R—CH$_2$—NH—CH$_2$—R$_1$ in which R is a member selected from the group consisting of alkyl, hydroxyalkyl and aminoalkyl and in which R$_1$ is a member selected from the group consisting of alkyl, hydroxyalkyl and aminoalkyl and salts of such amines with higher fatty acids, there being present in said composition a quantity of component (2) which is from about 0.1% to about 50% of the weight of said component (1) and a quantity of component (3) which is at least about 0.1% of the weight of said component (1) and which is not more than about 10 times the weight of said component (2).

5. A composition comprising (1) β-apo-8′-carotinic acid (2) an antioxidant selected from the group consisting of 6-ethoxy-2,2,4-trimethyl-1,2-dihydroquinoline, butylated hydroxy toluene, butylated hydroxy anisole, 4,4′-bis(2,6-ditertiary butyl phenol), γ-tocopherol and an ester of gallic acid with an aliphatic monohydroxy alcohol having from about 3 to 12 carbon atoms and (3), as a synergist, a member selected from the group consisting of an amine having the formula

R—CH$_2$—NH—CH$_2$—R$_1$ in which R is a member selected from the group consisting of alkyl, hydroxyalkyl and aminoalkyl and in which R$_1$ is a member selected from the group consisting of alkyl, hydroxyalkyl and aminoalkyl and salts of such amines with higher fatty acids, there being present in said composition a quantity of component (2) which is from about 0.1% to about 50% of the weight of said component (1) and a quantity of component (3) which is at least about 0.1% of the weight of said component (1) and which is not more than about 10 times the weight of said component (2).

6. A composition comprising (1) α-tocopherol (2) an antioxidant selected from the group consisting of 6-ethoxy-2,2,4-trimethyl - 1,2 - dihydroquinoline, butylated hydroxy toluene, butylated hydroxy anisole, 4,4′-bis(2,6-di-tertiary butyl phenol), γ-tocopherol and an ester of gallic acid with an aliphatic monohydroxy alcohol having from about 3 to 12 carbon atoms and (3), as a synergist, a member selected from the group consisting of an amine having the formula

R—CH$_2$—NH—CH$_2$—R$_1$ in which R is a member selected from the group consisting of alkyl, hydroxyalkyl and aminoalkyl and in which R$_1$ is a member selected from the group consisting of alkyl, hydroxyalkyl and aminoalkyl and salts of such amines with higher fatty acids, there being present in said composition a quantity of component (2) which is from about 0.1% to about 50% of the weight of said component (1) and a quantity of component (3) which is at least about 0.1% of the weight of said component (1) and which is not more than about 10 times the weight of said component (2).

7. A composition comprising (1) vitamin A palmitate (2) γ-tocopherol and (3) tetradecyl butylamine, there being present in said composition, a quantity of said γ-tocopherol which is from about 0.1% to about 50% of the weight of said vitamin A palmitate and a quantity of said tetradecyl butylamine which is at least about 0.1% of the weight of said vitamin A palmitate, and not more than about 10 times the weight of said γ-tocopherol.

8. A composition comprising (1) vitamin A palmitate (2) γ-tocopherol and (3) diethanolamine, there being present in said composition, a quantity of said γ-tocopherol which is from about 0.1% to about 50% of the weight of said vitamin A palmitate and a quantity of diethanolamine which is at least about 0.1% of the weight of said vitamin A palmitate, and not more than about 10 times the weight of said γ-tocopherol.

9. A composition comprising (1) vitamin A palmitate (2) 6-ethoxy-2,2,4-trimethyl-1,2-dihydroquinoline and (3) diethanolamine, there being present in said composition, a quantity of said 6-ethoxy-2,2,4-trimethyl-1,2-dihydroquinoline which is from about 0.1% to about 50% of the weight of said vitamin A palmitate and a quantity of diethanolamine which is at least about 0.1% of the weight of said vitamin A palmitate, and not more than about 10 time the weight of said 6-ethoxy-2,2,4-trimethyl-1,2-dihydroquinoline.

10. A composition comprising (1) vitaman A palmitate (2) 6-ethoxy-2,2,4-trimethyl-1,2-dihydroquinoline and (3) dodecyl, there being present in said composition, a quantity of said 6-ethoxy-2,2,4-trimethyl-1,2-dihydroquinoline which is from about 0.1% to about 50% of the weight of said vitamin A palmitate and a quantity of dodecylpentylamine which is at least about 0.1% of the weight of said vitamin A palmitate, and not more than about 10 times the weight of said 6-ethoxy-2,2,4-trimethyl-1,2-dihydroquinoline.

11. A composition comprising (1) β-apo-8′-carotinal (2) propyl gallate and (3) tetrahydrogeranyl hexylamine, there being present in said composition, a quantity of said propyl gallate which is from about 0.1% to about 50% of the weight of said β-apo-8′-carotinal and a quantity of said tetrahydrogeranyl hexylamine which is at least about 0.1% of the weight of said β-apo-8′-carotinal, and not more than about 10 times the weight of said propyl gallate.

12. A composition comprising (1) β-apo-8′-carotinic acid ethyl ester (2) γ-tocopherol and (3) diheptylamine, there being present in said composition, a quantity of said γ-tocopherol which is from about 0.1% to about 50% of the weight of said β-apo-8′-carotinic acid ethyl ester and a quantity of said diheptylamine which is at least about 0.1% of the weight of said β-apo-8′-carotinic acid ethyl ester, and not more than about 10 times the weight of said γ-tocopherol.

13. A composition comprising (1) dl-α-tocopherol (2) a mixture of butylated hydroxy toluene and butylated hydroxy anisole and (3) tetradecyl butylamine, there being present in said composition, a quantity of the mixture of butylated hydroxy toluene and butylated hydroxy anisole which is from about 0.1% to about 50% of the weight of said dl-α-tocopherol and a quantity of tetradecyl butylamine which is at least about 0.1% of the weight of said dl-α-tocopherol, and not more than about 10 times the weight of said mixture of butylated hydroxy toluene and butylated hydroxy anisole.

14. A composition comprising (1) vitamin A palmitate (2) γ-tocopherol and (3) spermine, there being present in said composition, a quantity of γ-tocopherol which is from about 0.1% to about 50% of the weight of said vitamin A palmitate and a quantity of spermine which is at least about 0.1% of the weight of said vitamin A palmitate, and not more than about 10 times the weight of said γ-tocopherol.

References Cited by the Examiner

UNITED STATES PATENTS 2,255,191  9/1941  Sebalitschka et al. _ 167—81 XR
2,756,177  7/1956  Cannalonga et al. _____ 167—81
3,070,499  12/1962  Mullins et al. _____ 167—81 XR

OTHER REFERENCES

The Merck Index, Seventh Edition, published by Merck and Co., Inc., Rahway, New Jersey, U.S.A., 1960, page 349.

LEWIS GOTTS, Primary Examiner.

FRANK CACCIAPAGLIA, JR., Examiner.

RICHARD L. HUFF, Assistant Examiner.